INVENTORS.
PIERRE CASSAGNE
GÉRARD MELCHIOR
BY [signature]
agent

INVENTORS.
PIERRE CASSAGNE
GÉRARD MELCHIOR
BY [signature]
agent

INVENTORS.
PIERRE CASSAGNE
GÉRARD MELCHIOR
By Kurt Kelman
agent

United States Patent Office 3,296,367
Patented Jan. 3, 1967

3,296,367

SYSTEMS FOR THE GENERATION OF SPECIAL EFFECTS IN COLOUR TELEVISION

Pierre Cassagne and Gérard Melchior, Levallois, France, assignors to Compagnie Francaise de Television, a corporation of France Filed Nov. 18, 1963, Ser. No. 324,282
13 Claims. (Cl. 178—5.4)

The present invention relates to colour television and more particularly to systems for generating certain special effects in colour television systems in which the complex video signal consists of a main wide-band signal, and at least one sub-carrier which is modulated by at least one colour signal, the spectrum of this modulated sub-carrier extending over a part of the spectrum of the main signal.

The main wide-band signal is the actual luminance signal, or at least is used as such by black-and-white television receivers, and it will hereinafter be generally designated as the luminance signal.

The colour signals are two in number and are generally transmitted by means of a single sub-carrier, although two sub-carriers may be used.

The term "special effects" as used here includes the progressive switching between signals belonging to two different scenes which results in that one picture gradually fades out into another picture, which result is sometimes called the lap-dissolve, and also the sudden switchings between signals belonging to different scenes, which generally results in a sudden substitution of a part of a scene by a part of another scene.

As is known, the former effect is obtained, in black-and-white television, by mixing in progressively varying proportions the picture signal from a first source of signals and the picture signal from a second source of signals.

To this end, the two picture signals are applied, for example, to two variable attenuators which are caused to operate synchronously in opposite directions so that the first signal gradually passes from normal to zero level while the second passes in the same manner from zero to normal level. The output signals from the two attenuators are applied to the two inputs of an adder, usually called "mixer," whose output signal is the desired signal, i.e. the variably weighted sum of the two video signals with respective coefficients $p$ and $(1-p)$, where $p$ varies from 1 to 0.

A correct obtaining of this gradual fading out in colour television requires that the "red," "blue" and "green" signals, used in the receiver for reproducing the blue, green and red picture components, should correspond rsepectively to the same weighted sum with the same coefficients $p$ and $(1-p)$, of the two sets of "red," "blue" and "green" signals, respectively corresponding to the two pictures.

When, as is generally the case, the production of these red, blue and green signals is effected in the receiver by means of a linear combination of the three signals transmitted, the desired effect will be correctly achived if each of the transmitted signals corresponds to the same weighted sum, with coefficients $p$ and $(1-p)$, of the corresponding signals of the first picture and of the second picture.

But when the complex video signal which modulates the carrier includes a sub-carrier modulated by at least one colour information, one meets with difficulties, or even with an impossibility, regarding the weighted summation of the video signals according to the above mentioned process as applied to black-and-white television signals.

For example, in the case of the NTSC system, the three signals transmitted are the luminance signal and two chrominance signals I and Q, the signals applied to the picture reproduction device being linear combinations of the signals transmitted. The luminance signal modulates the carrier directly, and the I and Q signals respectively amplitude modulate in phase quadrature two waves of the same frequency, the sum of these two modulated waves building up the twice modulated sub-carrier.

Under these conditions, it is possible to effect the weighted sum of the two complex signals to obtain a "sum" sub-carrier whose two components in quadrature are respectively amplitude modulated by two signals, each corresponding to the weighted sum of the two signals respectively corresponding to the first and the second picture. But on account of the double modulation, this requires that there should be no drift of the reference phases of the two sub-carriers, a condition which is not easily secured.

In the case of the "SECAM" system also called "Sequential Simultaneous System With Memory," the complex video signal comprises the luminance signal Y and a sub-carrier which is sequentially modulated by two chrominance signals C1 and C2, alternating at the line frequency, for example two narrow-band signals respectively proportional to the difference signals R–Y and B–Y, these signals C1 and C2 being repeated in the receiver by means of a storage system so as to be made simultaneous. Here again the signals applied to the picture reproduction device are linear combinations of the three signals transmitted. However, in a preferred embodiment of this system, the sub-carrier is frequency modulated. It is then impossible to operate by making the weighted summation of the two complex video signals on account of the fact that the signal that would be obtained by demodulating the sub-carrier resulting from such weighted summation would have no definite relationship with the weighted sum of the two signals which modulate the sub-carriers related to the two scenes.

As to the special effect generators in the more conventional sense of the term, they generally designate certain arrangements which produce various artistic effects:

(a) The total picture surface may be divided in two parts, one of which is an insert, which is limited by a contour, such as, for example, a rectangle, the remainder of the picture surface forming the second part.

In the insert, the picture seen is the same as that which would appear on the corresponding screen portion if a picture A were to extend over the whole of the available picture frame, this picture A being obtained from a first source of signals. As to the remainder of the available screen surface, the picture seen is the same as that which would be seen if another picture B, obtained from another source of signals, synchronous with the former, covered the whole of the available screen surface.

(b) A picture B, for example a subtitle or a character is inset in another picture A. The inset picture is accordingly no longer a fraction of another "total" picture. It is limited by the very contour of the object or character displayed or of the letters of a subtitle. These contours are themselves the limits of the surface or surfaces within the frame inside which picture A has to be superposed by the inset picture.

The above effects, and more generally the effects produced by a sequence of sudden switchings have in common the fact that they require a switching circuit which is fed from at least two sources of picture signals and directs to its output the signals of one source or the other, according to some law determined by the effect to be obtained, for example by the contour of an inset or of an insertion.

A drawback arises, in the production of such special effects in a colour television system including the transmission of a frequency or phase modulated sub-carrier when using a switch of the type used in black-and-white television.

For, in this case, what is switched is the complex signal as a whole and the change over during the active periods, i.e. those corresponding to the transmission of the actual picture signals, from one sub-carrier to the other, causes, in the sub-carrier of the complex special effect signal, sudden phase changes to which frequency demodulators are sensitive, and which cause colour defects on the "trick" picture supplied by the receivers.

Further, it is useful that the special effect device should accept as input picture signals complex video signals related to the two pictures used for obtaining the special effect required, since this makes it possible to transmit the picture signals over a single channel between each source and a special effect generator.

The invention has for its object to provide a special effect generator which solves in a satisfactory manner the difficulties mentioned above.

A device for the production of special effects for colour television according to the invention comprises two inputs receiving respectively the complex video signals S′ and S″ relative to the two scenes concerned, and an output delivering a complex video signal S which, outside the periods during which special effects are to take place, is identical to one of signals S′ and S″ with no loss of quality for this signal, and which, while a special effect is being produced, is the complex special effect video signal.

It is provided with two inputs which receive the complex video signals S′ and S″, related to the two pictures, and an output delivering the complex video signal to be transmitted; two demodulation devices for demodulating the two sub-carriers; two special effect switches working in synchronism on the luminance signals and on the colour signals which modulate the sub-carriers; a device remodulating on a sub-carrier the output signal from the special effect switch operating on the colour signals; a filtering system which eliminates from the output signal from the special effect switch for the luminance signal the components due to the sub-carriers appearing in the input complex video signals, and an ancillary circuit, operated by a switching device, for the complete retransmission of one or the other input complex video signal outside the periods during which special effects are being produced.

The invention will be better understood and other characteristics thereof will become apparent from the following description and the appended drawings, in which.

Figure 1:
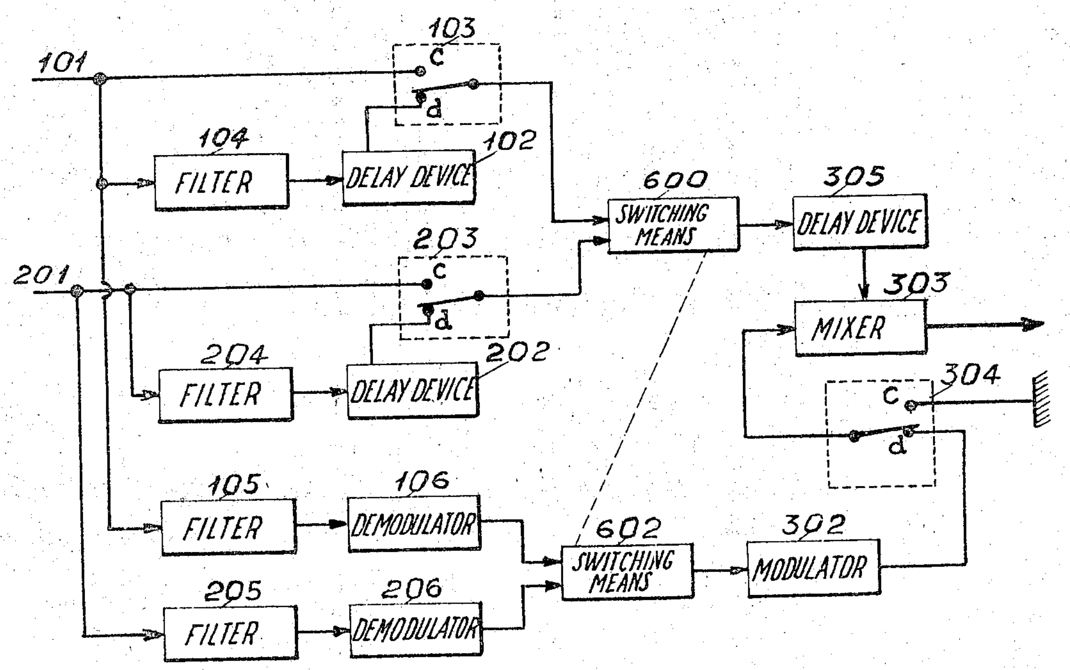
FIG. 1 is a diagram of one embodiment of a special effect device according to the invention.

The invention will be described in the case of a sequential simultaneous system with memory, with frequency modulation of the sub-carrier.

The input signal S′ consists of the complex video signal, made up of luminance signal Y′ relative to the first scene, and a sub-carrier alternately modulated by the first colour signal C1′ relative to the first scene, and by the second colour signal C2′ relative to the first scene. It also preferably includes the line and frame synchronizing signals, and the identification signals for signals C1′ and C2′, all these auxiliary signals occurring during the horizontal and vertical blanking periods, and among them only the identification signals being transmitted by modulation of the sub-carrier.

The input signal S″ consists of the corresponding signals relative to the second scene, which signals will be designated by the same reference letters as those used for the signals from the first source but provided with a double prime instead of a prime.

In the special effect device according to the invention input signals S′ and S″ have to be in phase. This requires first that their respective synchronizing signals should coincide in time. This requirement is the same as for the generation of special effects in black-and-white television, and can be satisfied by the same means.

In the second place, when, as in the embodiment described, the simultaneous sequential system with memory is considered, transmission periods of signals C1′ and C2′ have to coincide respectively with the transmission periods of signals C1″ and C2″. This phase concordance between the two colour signals can be secured in different ways. It will be here recalled that in the formation of the complex video signal the alternating signals C1 and C2 are obtained by means of a switch, designated as coding switch, which directs alternately to its output the signal C1 and the signal C2 under the action of a control signal provided by a control signal generator.

In the case of a single synchronizing signal generator for both signal sources, a single switching signal generator may be used, whose frequency is controlled by the synchronizing signal generator. This case usually occurs when the two signal sources are not too remote from each other and consequently not too far from the single synchronizing signal generator. It is then clear that the feed of the two coding switches by the also single switching signal generator raises no greater difficulty than the feed of the cameras by the synchronizing signal generator.

A second regular case is that in which each signal source has been provided with a separate synchronizing signal generator, on account, for example, of the long distance between them.

In this case the synchronization signal generator, associated with one of the sources, designated as the "near source," is controlled by the signals from the generator associated with the other source, designated "far source," by the process known as the "gen lock" process (these synchronizing signals being included in the signals received from the far source).

Two switching signal generators can then be used, respectively associated with the two coding switches and respectively controlled by the two synchronizing signal generators.

The switching signals are generally rectangular signals with two alternate levels, each level being maintained for the duration of one picture line. If one period of the switching signal is assimilated to one cycle of a sinusoidal oscillation, the two switching signal generators, whose frequency is the half line scan frequency, can be said to be controlled by the synchronizing signal generators, not only in frequency but also in phase, but only to within angle $\pi$. On this account they can deliver switching signals only in phase or in phase opposition.

In order to secure phase concordance between the two switching signal generators, one can, for example, control one generator by the other by means of a suitable coupling between them or by using identification signals, normally inserted in the complex video signal of the sequential simultaneous system with memory. Such a signal having the frame frequency has been described in the copending application for "Improvements In Colour Television," Serial No. 270,464, filed April 3, 1963, and assigned to the same assignee.

The above arrangements for securing phase concordance between the colour signals of the two sources are given by way of example only and do not as such belong to the subject matter of the invention.

Referring now to FIG. 1, signals S′ and S″ are respectively applied to the inputs 101 and 201 of the arrangement according to the invention.

Input 101 feeds directly one of the inputs *c* of a switch 103, having two inputs and one output, here assumed to be a mechanical switch with two inputs *c* and *d* and whose output is a contact movable between contacts *c* and *d*.

Input 101 also feeds the fixed contact *d* of switch 103 through a filter 104, which removes from the complex video signal S′ the band covered by the modulated sub-carrier, and a delay device 102. Input 101 also feeds a filter 105 which passes that same frequency band. Filter 105 feeds a frequency demodulator 106.

An input 201 feeds identical circuits, where the elements corresponding to the above described elements are designated by the same reference numbers plus 100, switch 203 having two fixed contacts *c* and *d*, respectively corresponding to the fixed contacts *c* and *d* of switch 103.

Two special effect switches 600 and 602, or more briefly "effect switches" are provided. They are identical to the switch used in black-and-white television for producing the corresponding special effect on the single picture signal.

That is to say that, in the case of a special effect consisting in the insertion of an image portion or an object each switch 600 and 602 is an electronic switch with two signal inputs, one control input and one output. The switch connects its output to one or the other of its signal inputs depending on the level of the signal applied at its control input. Designating generally by $x$ and $z$ the signals respectively applied to the first and to the second input of such a switch, it will deliver the signal $$px+(1-p)z$$

where $p$ can have only the values 1 or 0.

In the case where it is desired that one scene fades out into another, each special effect switch is a more complex device which, designating still the input signals by $x$ and $z$, supplies an output signal $px+(1-p)z$, in which expression $p$ may have not only the values 1 and 0 but also all intermediate values.

Switches 600 and 602 are operated in synchronism so that $p$ has at every instant the same value in both switches. This is shown symbolically by the dotted line connection between switches 600 and 602 in FIG. 1.

The first and the second input of switch 600 are respectively connected to the moving contacts of switches 103 and 203. The output of switch 600 is connected to the input of a delay device 305 whose output feeds the first input of an adder 303.

The outputs of demodulators 106 and 206 are respectively connected to the first and to the second input of the special effect switch 602, whose output feeds the modulation input of an oscillator 302 which can be frequency modulated.

The output of modulator 302 is connected to the fixed contact *d* of a switch 304, identical to switches 103 and 203 and whose other fixed contact *c* is grounded. The moving contact of switch 304 is connected to a second input of adder 303, whose output is the output of the device.

Switches 103, 203 and 304 will be designated as "operating condition switches" in opposition to the "special effect switches" 600 and 602, since their respective positions define the general operating condition, to wit whether the televised scene comprises special effects generally or not. Thus, these condition switches are actuated only to pass from a normal transmission of one of the signals S′ and S″ to a transmission with generation of a special effect bringing into play both signals, or vice versa.

Although, to make the diagram clear, switches 103 and 203 are shown as mechanical switches, they can be electromechanical or preferably electronic switches which are switched by vertical blanking pulses, whose application to the condition switch is controlled manually. In this way each switch comes into action during one vertical blanking interval.

As regards filters 104, 105, 204 and 205, it is to be noted that in one mode of realization of the "SECAM" system or sequential simultaneous system with memory, the luminance signal has a bandwidth of 6 mc./s., the sub-carrier frequency being 4.43 mc./s., approximately, and its modulation spectrum, at 3 db, covering 1 mc./s. on either side of the sub-carrier.

With numerical data of this order, one may consider, that, during a special effect, the modulated sub-carrier spectrum extends substantially up to the maximum frequency of the luminance signal spectrum; in other words, the part of the luminance signal spectrum including frequencies above those of the spectrum of the modulated sub-carrier may be disregarded, and consequently filters 104 and 204 may be low-pass filters instead of band-stop filters, and filters 105 and 205 high-pass filters instead of band-pass filters.

The arrangement shown in FIG. 1 operates as follows:

Outside the time intervals when special effects are generated, the input signals relative to one of the two sources, for example source S′, are wholly and continuously transmitted. The condition switches 103, 203 and 304 have their respective outputs connected to their respective fixed contacts *c*. Switch 600 is adjusted to have $p=1$. That is to say, it fully transmits the signal applied to its first input and the signal applied to its second input is not transmitted at all. Since switch 103 has its output connected to its input *c*, the signal transmitted is the input signal S′.

Since switches 600 and 602 are ganged, the latter is likewise adjusted to have $p=1$, but, as will be seen later, its output signal is not used.

Signal S′ passes through delay device 305 and adder 303, without being modified in the latter, for the second input of adder 303 is then grounded through condition switch 304.

Consequently, it is signal S′ that is actually collected at the output of adder 303.

The part played by delay devices 102, 202 and 305 will be explained after the mode of operation of the circuit, while a special effect is being produced, has been described.

To transmit signal S″ instead of signal S′, all that is required is to adjust the special effect switches 600 and 602 to have $p=0$ instead of $p=1$.

Immediately before a special effect is generated, the condition switches are actuated to connect their respective outputs to their respective inputs *d*. Switch 600 then receives respectively at its first and at its second input, signals S′ and S″ from which the frequency band covered by the modulated sub-carrier has been eliminated, in other words the luminance signals Y′ and Y″ less their components whose frequencies are situated in this band. These components are the higher frequencies of the luminance signal if, as in the numerical example given earlier, the modulated sub-carrier covers the upper region of the luminance signal spectrum. These band restricted luminance signals will be designated Y*a*′ and Y*a*″.

Switch 602 similarly receives respectively at its two inputs the signals C′, i.e. alternately signals C1′ and C2′, and C″, i.e. alternately signals C1″ and C2″.

The two switches 600 and 602 are synchronously operated. In all cases $p$ will have the same value for both of them. However, in the case of one scene fading out into another, $p$ varies gradually from $p=1$ to $p=0$ or from $p=0$ to $p=1$, whereas in the case of an insert, the value of $p$ passes abruptly and successively through values 0 and 1, which follow each other in accordance with the effect to be produced.

In each case, the mode of operation of each of these switches is the same as in the corresponding switch in black-and-white television, the only precaution required being to make switches 600 and 602 operate in synchronism.

Switch 600 supplies the band restricted special effect luminance signal which will be designated by Y*ac*, while switch 602 supplies the special effect colour signal C*c*.

This C*c* signal remodulates a sub-carrier in frequency modulator 302, and this modulated sub-carrier is transmitted by condition switch 304 to the second input of adder 303, which also receives signal Y*ac* on its first input, through delay device 305. So adder 304 supplies the complex video special effect signal at its output. It should be noted that the auxiliary signals are identical for both sources, and are always to be found in the output signal, even when a special effect is being produced, on account of the fact that if an effect switch receives equal signals $x=z$ at its two inputs, it supplies $px+(1-p)x=x=z$.

Delay device 102 is used for equalizing the path of signal Y*a'* between input 101 and special effect switch 600, and the path of signal C' between input 101 and special effect switch 602.

Delay device 202 plays the same part in equalizing the paths of signals Y*a''* and C''.

Delay device 305 equalizes the paths between the output of the special effect switch 600 and adder 303, and between the output of the special effect switch 602 and adder 303. Since the pass-band of the sequential signal channel is narrower than that of the luminance signal and since the electrical length of the path from input 101 or input 201 to the second input of adder 303 is greater than that from input 101 or input 201 to the first input of adder 303, it is always the luminance signal that has to be delayed.

The delay introduced by devices 102 and 202 could also be applied in filters 104 and 204.

It should be noted that in the case of one scene fading out into another, it is not essential to equalize separately the paths before and after the special effect switch, as is the case for the inserts.

If switches 600 and 602 are switches where the value of *p* varies gradually, it is possible to impart an overall equalization using only delay device 305, or using only delay devices 102 and 202.

The arrangement described above possesses the advantage that, when no special effects are generated, it fully transmits signal S' or S''.

The frequency-bandwidth restriction of the luminance signal Y*ac* as a result of the band restriction of signals Y*a'* and Y*a''* occurs only while a special effect is being produced, when the eye is much less sensitive to loss of definition, in particular while one scene is fading out into another, the picture being then essentially blurred. When an insert is being made into a scene, this is generally quite unexpected for the viewer, and frequently the picture varies quite rapidly. The resulting psychological effect on the observe diverts the latter's attention so that a loss of definition generally remains unnoticed.

It is also obvious that this reduction of the frequency-bandwith of the luminance signal is necessary, since it is not possible to maintain the whole of the luminance signal at the input of adder 303 without its being accompanied at every instant by the sub-carrier of one or the other of the two input signals in the case of an insert or of a mixture of the sub-carriers of the two signals in the case of the fading out of a scene into another one, which sub-carriers would then be superimposed on the modulated sub-carrier supplied by modulator 302.

Figure 2:
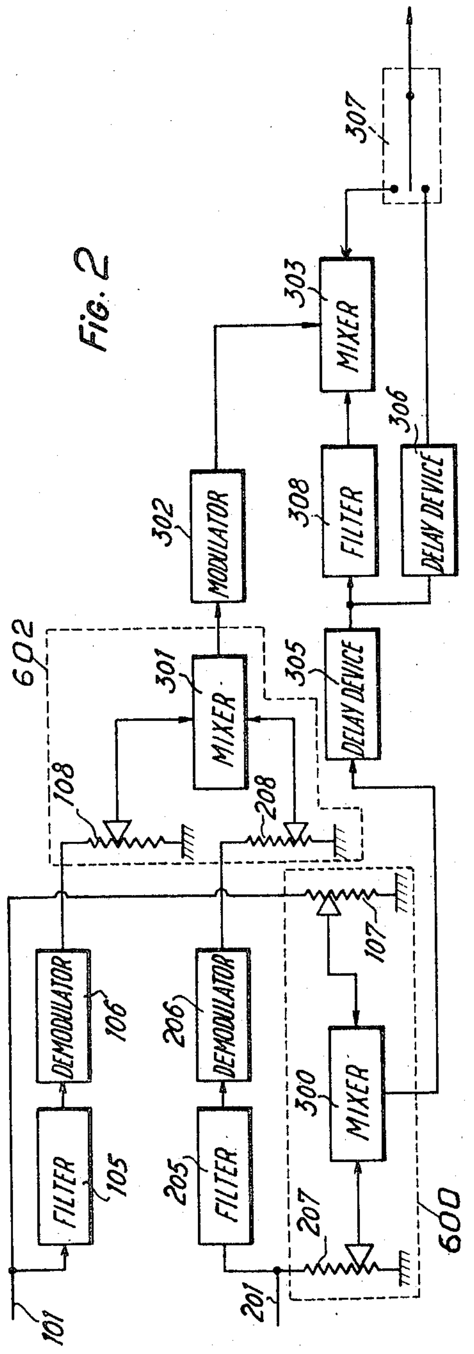

FIG. 2 is a modification of FIG. 1 which has the advantage of a simplified luminance signal frequency-band reduction arrangement and condition switch system. The case of an arrangement for generating the special effect consisting in the fading of one scene into another has been taken as an example.

Inputs 101 and 201, elements 105, 106, 205, 206, 302, 303 and 305 are the same as in FIG. 1.

Input 101 feeds in parallel a variable attenuator 107 and filter 105, which extracts from the complex video signal the band covered by the modulated sub-carrier.

The output of filter 105 feeds the frequency demodulator 106.

The output of demodulator 106 feeds a variable attenuator 108.

Input 201 feeds an identical circuit, whose elements are designated by the number identifying the corresponding elements in the first circuit, but increased by 100. The last two elements are the variable attenuators 207 and 208.

The outputs of attenuators 107 and 207 are connected to the two inputs of an adder 300, while the outputs of attenuators 108 and 208 feed the two inputs of another adder 301.

The output of adder 301 feeds the input of frequency modulator 302. The output of modulator 302 is connected to the second input of adder 303.

The output of adder 300 feeds the delay device 305 whose output is connected in parallel to a filter 308, identical to filters 104 and 204 of FIG. 1, and to a delay device 306.

Filter 308 thus removes from its input signal the band covered by the modulated sub-carrier.

The output of filter 308 is connected to the first input of mixer 303.

The outputs of adder 303 and of delay device 306 are connected to the two inputs of a single condition switch 307, which takes the place of switches 103, 203, and 304 in FIG. 1.

Elements 107, 207 and 300 build up switch 600 of FIG. 1, and elements 108, 208 and 301 take the place of switch 602 of FIG. 1.

The arrangement of FIG. 2 operates as follows:

When it is required to pass only the signal from the first source, which signal is applied to input 101, switch 307 connects its moving contact to delay device 306, with attenuator 107 adjusted to zero attenuation and attenuator 207 to full attenuation resulting in a total supression of its input signal, all these operation being preferably effected by a ganged control.

Attenuator 107 then receives unmodified the signal applied at input 101 and transmits it to adder 300.

Attenuator 207 supplies no output, since it is set to total attenuation.

Adder 300 then supplies only the signal applied at its input 101, passing this signal on to the output of the circuit of FIG. 2 through the delay device 306 and switch 307.

To pass only the signal corresponding to the second signal source, switch 307 is brought to the same position, but now it is attenuator 207 that is set to zero attenuation and attenuator 107 to total attenuation. In other words, in this preferred case of ganged control of the attenuators and of switch 307, switch 307 connects its output to device 306 when the attenuators are in one or the other of their two end positions.

For the fading of one scene into another, as the attenuators leave their end positions, switch 307 is actuated so as to connect its output to adder 303.

Attenuators 107 and 207, on the one hand, 108 and 208, on the other, are operated synchronously, in one direction for attenuators 107 and 108, and in the opposite direction for attenuators 207 and 208.

It is readily seen that, under these conditions, adder 300 supplies signals S' and S'' mixed to each other, with the resulting mixed signal having its frequency band reduced by the band corresponding to the sub-carrier in filter 308. Similarly, the colour signals C' and C'' are mixed in switch 602, whose output signal is applied to modulator 302. The fresh modulated sub-carrier is applied to the second input of adder 303 which receives on its first input the mixed and frequency reduced luminance signal Y*a* from filter 308.

So adder 303 supplies in each case the complex picture signal used for modulating the carrier.

Delay line 305 is the line whose purpose is to delay the luminance signal Y*a* applied to the first input of mixer 303 so that this signal may duly arrive at this mixer in synchronism with the sub-carrier modulated by the mixed auxiliary signal applied to the second input of mixer 303.

Thus, in the circuit of FIG. 2, the delay system 305 effects an overall correction of the various paths 101–303 and 201–303. Delay device 308, which is optional, provides a further path equalization, i.e. equalization of the paths from input 101 (or 201) to the first and second inputs of switch 307, so that the switching operation effected in this switch should cause no sudden picture shift.

In view of the delay already introduced in device 305, the delay device 306 now only needs to compensate the path through filter 308 and adder 303.

Switches 600 and 602 serving for causing one scene to fade out into another scene have been shown as built up by two attenuators and a mixer. It is apparent that this example is not restrictive and that the attenuators can be replaced by any device capable of varying the values $p$ in synchronism in the expression for the output signals from these switches.

Figure 3:
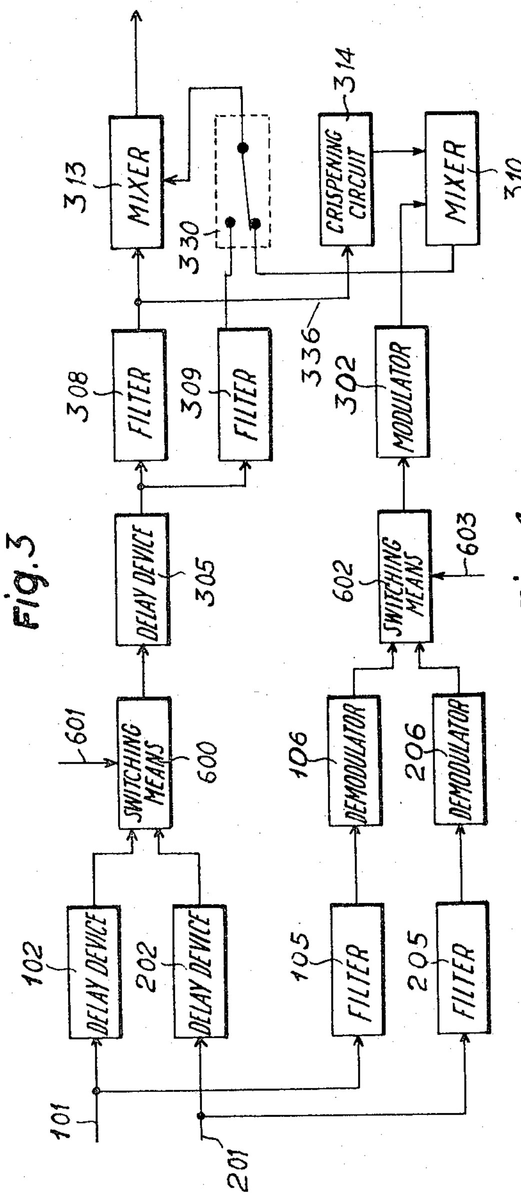

FIG. 3 is a modification of the circuit of FIG. 2 with two improvements. One of these improvements is concerned with a better change from the "single picture" operation to the operation with generation of a special effect, or conversely.

It is of course preferable that the observer perceives no gap between the two operation modes; in other words the change of conditions should not be perceptible.

One of the causes of perceptibility of the change-over may be the difference between the durations of the electrical paths between the inputs and outputs of the condition switch 307, depending upon the prevailing operation mode. The delay device 306 of FIG. 2 overcomes this defect.

A second cause may be due to a difference of gain on luminance, depending upon the operation mode.

A third cause may arise from practically unavoidable defects in the switching operation: switch transients or imperfect simultaneity of the switching out of one of the channels with the switching in of the other.

It is known to reduce the consequences of defects of this type in switching operations of this kind by using as indicated for the condition switch 307, an electronic switch whose changes of state are obtained under the action of vertical blanking pulses, whose application to the switch may be controlled manually. In this way, each change-over takes place during one vertical blanking interval. But this arrangement is insufficient to ensure positively that there is no discontinuity in line synchronization which may result in difficulties in the receivers.

The arrangement of FIG. 3 greatly contributes toward making the change-over between two operation modes invisible due to the fact that most of the luminance signal can always be transmitted over the same channel.

Also, this circuit contains a second improvement acting on picture quality while special effects are being produced, through the use of a technique for increasing the sharpness of the picture, known as "crispening." The case here considered is that of an insert being made in the picture in which case switches 600 and 602 are two electronic switches whose control inputs are shown at 601 and 603.

The circuits which connect inputs 101 and 201 to switches 600 and 602 are identical to those of FIG. 2, except that delay devices 102 and 202 are here inserted between inputs 101 and 201 and special effects switch 600.

As in the case of FIG. 2, the outputs of switches 600 and 602 are respectively connected to delay device 305 and modulator 302.

Delay device 305 feeds in parallel a filter 308 which, in respect of the frequency band of the complex video signal, is complementary to filters 105 and 205 and a filter 309 identical to filters 105 and 205.

The output of filter 308 is connected to the first input of an adder 313 and to the input of a crispening circuit 314. The latter's output is connected to the first input of another adder 310.

The output of filter 309 is connected to the first signal input of a condition switch 330, identical to the condition switches in the previous figures.

The output of frequency modulator 302 is connected to the second input of adder 310. The output of adder 310 is connected to the second input of condition switch 330, whose output is connected to the second input of adder 313. The output of adder 313 is the output of the arrangement.

To apply the crispening technique in this arrangement, filters 105, 205 and 309 are high-pass filters, and not band-pass filters, and filter 308 is a low-pass filter, and not a band-stop filter.

The arrangement functions as follows while a special effect is being produced:

Switch 330 is set to connect its output to adder 310.

The sub-carriers of signals S′ and S″ are respectively filtered by filters 105 and 205 and demodulated by demodulators 106 and 206 which supply signals C′ and C″. The latter are respectively applied to the inputs of switch 602.

Also, the complex signals S′ and S″ are applied to the two inputs of switch 600 through delay devices 102 and 202.

Device 102 compensates for the path 105–106 so that the signal S′ applied to the first input of switch 600 is in phase with the signal C′ applied to the first input of switch 602. Delay device 202 has the same function for S″ and C″.

Switches 600 and 602 are actuated by switching signals applied to their control inputs 601 and 603, either by two separate switching signals generators, or by a single generator.

This single generator, or each of the two generators, can be of any known type used in black-and-white television. It is known that these generators produce the switching signals to suit the effect required, either, in the case of an insert purely, electronically, by combination of elementary signals, or, in the case of an insetting of an object, by a device using an auxiliary black-and-white pick up tube for analyzing the object whose picture has to be inserted, this object being placed in front of a background darker than its darkest parts, or brighter than its brightest parts. The auxiliary pick up tube then supplies a picture video signal whose level lies on either side of a threshold value, depending upon whether it is related to the object or to the background, a signal from which the actual switching signal is readily obtained.

In order to simplify the description, it will first be supposed that switches 600 and 602 are controlled synchronously by a single switching signal generator feeding their control inputs 601 and 603, that is to say there are present simultaneously at the outputs of switches 600 and 602, either signals S′ and C′ in phase, or signals S″ and C″ in phase.

The colour special effect signal $Cc$ which appears at the output of switch 602 is used to remodulate a sub-carrier of the same frequency as the preceding ones in the frequency modulator 302 and the modulated sub-carrier is applied to the first input of adder 310.

Also, the output signal $Sc$ from switch 600, after it has passed through delay device 305, is applied in parallel to low-pass filter 108 and high-pass filter 109.

The output signal from filter 308, i.e. signal $Ya$, is thus the luminance signal corresponding to S′ or S″, but in both cases with its higher frequencies suppressed.

This signal is applied to the first input of adder 313, and to the input of circuit 314 to produce a crispening signal.

Crispening technique is described, in particular, in the Proceedings of the I.R.E., October 1951, pages 1314 to 1322; it consists in adding higher-frequency components to the luminance signal to hasten the speed of transition, which are in practice always limited by the signal bandwidth. The circuit which supplies the correction signal, a circuit whose main element is a differentiator, receives the signal to be corrected, and the correcting signal is added to the signal to be corrected.

It is especially useful in the present case to apply crispening to the luminance signal while a special effect is being produced, on account of the band restriction applied to it by filter 308.

In FIG. 3, circuit 314 is fed by filter 308, the latter being the element which delivers the signal to be corrected, i.e. the luminance signal with reduced bandwidth. Circuit 314 delivers the correcting signal according to the abovementioned technique and this signal is applied to the second input of adder 313 through condition switch 330. Thus the output of adder 313 supplies the complete special effect signal.

When no special effect is being produced, signal S′ or S″ is wholly transmitted. In the arrangement of FIG. 3 this is effected as follows:

Special effect switch 600 is permanently set to the value $p=1$ or $p=0$. Also, condition switch 330 is set to its second position, at which it connects filter 309 to the second input of adder 313. The latter then reconstitutes signal S′ or S″ which has been decomposed by filters 308 and 309.

The advantage of this arrangement over a short-circuit between the inputs and the output of the arrangement is the following:

The greater part of the luminance signal is always transmitted over the same channel whether a special effect is being produced or not, and this considerably improves the change-over from one operating condition to the other, while largely attenuating defects inherent in any change-over.

As previously mentioned, in order to produce the various special effects which the operator can devise, it is possible to control the two special effect switches by means of two different switching signal generators, which does not invlove any modification of the elements shown in FIG. 3. The operation of switches 600 and 602 remains synchronous, in the sense that it extends over identical active periods; those of the transmission of the actual picture signals. However, switches 600 and 602 are not then necessarily in the same state, i.e. are not necessarily set to the same value of $p$ at every instant of these active periods.

Figure 4:
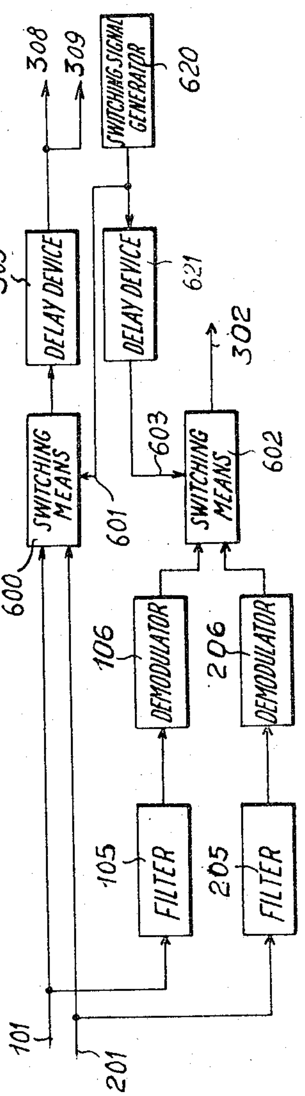

FIG. 4 shows a modification of the circuit of FIG. 3.

Only those parts which are modified with respect to FIG. 3 are shown in FIG. 4. The delay devices 102 and 202 of FIG. 3 which would produce identical delays, have been suppressed, the delay device 305 compensating for the whole of the difference between the electrical paths between the luminance channel and the colour signal channel.

If the two special effect switches are operated by the same switching signal generator 620, a device 621 is inserted between generator 620 and switch 602, this device imposing a delay equal to the common duration of paths 105–106 and 205–206, so that at the output of the special effect generating system the special effect luminance signal is always accompanied by the colour signal from the same input source.

Since the switch control signals generally have only two separate levels, the delay device 621 may have a simple structure: it may be a delay line with a narrow pass-band or a monostable multivibrator.

It will be noted that the mode of operation of the arrangement of FIG. 3 is identical to that of FIG. 2 up to the outputs of elements 305 and 302, except that these elements supply signals relative to an insert or an insetting into the scene instead of signals relative to a scene fading out into another one. But it is clear that the general circuit of FIG. 3 can be used for obtaining this latter effect, provided suitable special effect switches are present, and that the switch of FIG. 2 can be used for obtaining an insert, provided corresponding special effect switches are included and the paths preceding these switches are equalized.

Figure 5:
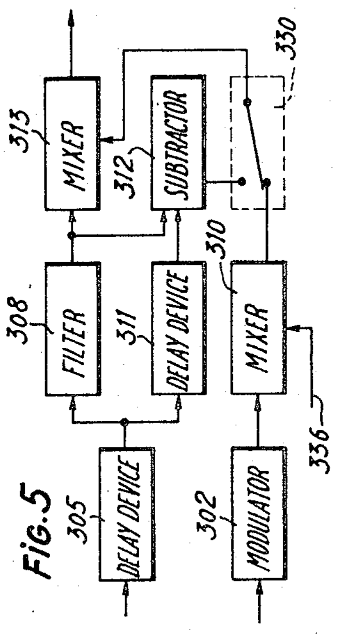

FIG. 5 shows a modification of the arrangement of FIG. 3 applicable to both types of special effects and satisfactorily solving the problem of ensuring that the two signals into which the output signal of delay line 305 are broken up, are prefectly complementary.

The circuits ahead of elements 305 and 302 remain unchanged.

FIG. 5 shows the elements 302, 305, 308, 313 and 330 of FIG. 3. With the view of applying the crispening technique, filter 308 is again of the low-pass type.

The modifications from the arrangements of FIG. 3 is the following:

High-pass filter 309 is replaced by a delay device 311, fed from delay device 305, and a subtractor 312, whose two inputs are respectively connected to the output of filter 308 and of delay device 311.

Delay device 311 compensates for the delay caused by filter 308 so that the total output signal from delay line 305 and its lower frequencies extracted by filter 308 are simultaneously at the inputs of subtractor 312 which thus supplies a signal complementary to that supplied by filter 308.

The arrangement operates in the same way as that shown in FIG. 3.

Instead of retaining filter 308, and replacing filter 309 by a subtractor fed from delay line 305 and filter 308, it is of course possible to maintain filter 309 and to replace filter 308 by subtractor 312 fed from delay line 305 and filter 309.

Figure 6:
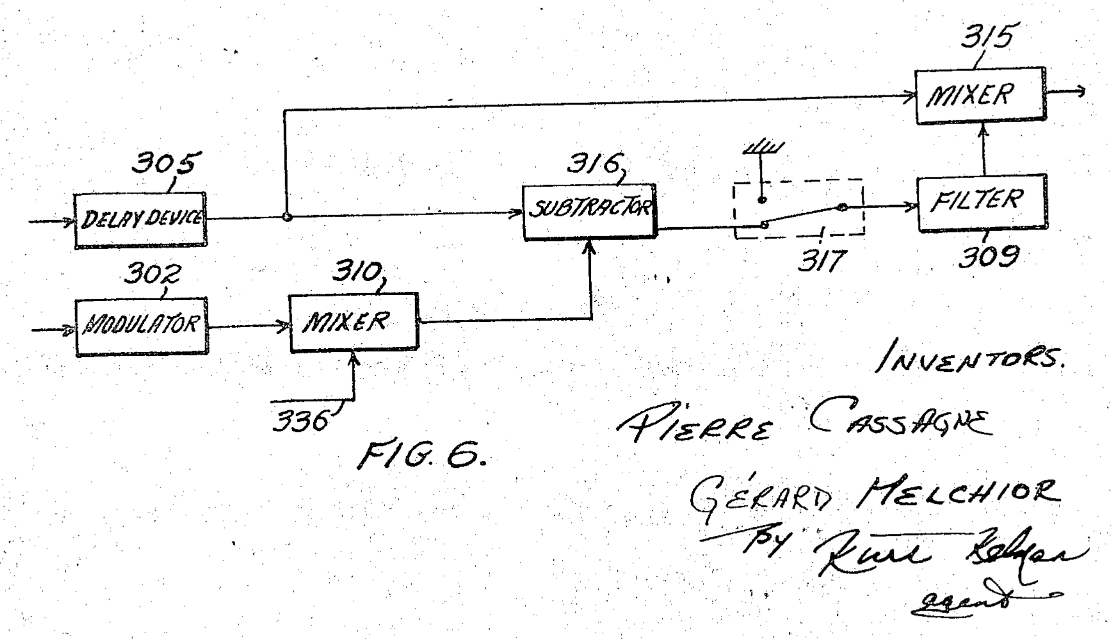
FIGS. 2 to 6 show various improvements of the arrangement of FIG. 1.

FIG. 6 is a modification of FIG. 5.

Devices 305, 302 and 310 are again present.

But delay device 305 feeds in parallel the first input of an adder 315 and the second input of a subtractor 316, the first input of which is connected to the output of mixer 310. Subtractor 316 subtracts the signal supplied by the delay line 305 from the signal supplied by adder 310, and its output is connected to the first input of a condition switch 317, possessing two inputs and one output, the second input of which is grounded. The output of switch 317 is connected to the input of filter 309 whose output is connected to the second input of adder 315, whose output is the circuit output.

The output of switch 317 is connected to ground for the "single picture" operating condition, and the signal supplied by delay line 305 is thus extracted at the circuit output.

There is then at the output of adder 315 the same signal as that supplied by delay line 305.

While a special effect is being produced, switch 317 connects its output to subtractor 316.

Calling $s$ the part of signal $Sc$ consisting of its components in the pass-band of high-pass filter 309, then:

$$Sc=Yac+s$$

P will designate the output signal from adder 310, this signal consisting of the fresh sub-carrier modulated by the signal $Cc$, and the crispening components.

Subtractor 316 then supplies the signal $$P-Yac-s$$

and filter 309 supplies the signal $P-s$, since the signal $Yac$ is stopped by the filter.

There then appears at the output of adder 315, while a special effect is being produced a signal $$P-s+Yac+s=Yac+P$$

that is to say, the same output signal as with the previous circuits.

The advantage of this arrangement is that filter 309 can be inserted after the switch, so suppressing switching transients whose frequencies are outside the band of filter 309.

If, as shown in FIG. 6, the crispensing technique is used in this arrangement, the crispening components generating circuit, i.e. circuit 314 in FIG. 3, should be connected to the output of the delay line 305 through a low-pass filter.

The invention is not restricted to the embodiments shown and described. In particular, one may use special effect switches of a more complex nature than those which have been indicated hitherto.

As an example, a composite switch may be used as switches 600 and 602 with the following structure: the first input of the composite switch feeds in parallel the first inputs of two gradual fading switches; the second input of the composite switch feeds in parallel the second inputs of the two gradual fading switches; and the outputs of the two above switches respectively feed the two inputs of an insert special effect switch, whose output is the output of the complex switch. Such a composite switch may, for example, be used with the two gradual fading switches being set for two predetermined values of $p$, say $p=p1$ and $p=p2$.

What is claimed is:

1. A system for generating special effects by means of signals supplied by a first and a second source in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output," onto which the complex video signal to be transmitted is directed; a first special effect switch having two signal inputs and an output; a first and a second channel having respective inputs respectively coupled to said first and second general inputs, and respective outputs respectively coupled to said two signal inputs of said first special effect switch; a third channel coupled to said output of said first special effect switch; two series circuits, respectively fed by said first and second general inputs, for extracting the modulated sub-carriers from said first and second input complex video signals and demodulating said sub-carriers, each of said series circuits having an output and comprising a filter and demodulating means; a second special effect switch having two signal inputs respectively coupled to said outputs of said two series circuits and an output; means for modulating a new sub-carrier, said modulating means having a modulation input coupled to said output of said second special effect switch and an output; filtering means, hereinafter referred to as "band restricting filtering means," said band restricting filtering means being inserted in $n$ of said channels, where $n$ is a positive integer smaller than three, and being adapted for eliminating from the output signal of said first special effect switch those components which are due to the sub-carriers included in said input complex video signals, the band-restricted signal resulting from the operation of said band restricting filtering means being hereinafter referred to as "special effect luminance signal"; and further means, controlled by switching means, referred to as "operating condition switching means," for selectively:

(a) switching said band restricting filtering means out of said $n$ channels and applying to said general output the output signal of said first special effect switch or (b) leaving said band restricting filtering means inserted in said $n$ channels and adding said special effect luminance signal to the output signal of said modulating means to build up the complex video signal which is applied to said general output.

2. A system as claimed in claim 1, wherein said special effect switches are progressive switching means.

3. A system as claimed in claim 1, wherein said band restricting filtering means comprise two band restricting filters respectively inserted in said first and second channels; said further means comprising an adder having a first input coupled to said output of said first special effect switch, a second input and an output, which is said general output, and wherein said operating condition switching means comprise a first and a second two-state operating condition switch which, in their first state, switch said band restricting filters out of said first and second channels, and which, in their second state, respectively leave said two band restricting filters inserted in said first and second channels, and a third two-state operating condition switch, which, in its first state, connects said second input of said adder to ground, and, in its second state, connects said second input of said adder to said output of said modulating means.

4. A system as claimed in claim 1, wherein said colour signal modulating said sub-carrier is alternately constituted by two different colour signals alternating at the line frequency.

5. A system as claimed in claim 1, wherein said special effect switches are two-state switches having respective control inputs, said system further comprising switching signal generating means coupled to said control inputs.

6. A system as claimed in claim 5, wherein said switching signal generating means comprises a single signal generator having an output connected to said control input of said first special effect switching means, said system further comprising a delay device, which is inserted between said switching signal generator output and said control input of said second special effect switch.

7. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output," onto which the complex video signal to be transmitted is directed; a first special effect switch having two signal inputs and an output; a first and a second channel having respective inputs respectively coupled to said first and second general inputs, and respective outputs respectively coupled to said two signal inputs of said first special effect switch; a third channel coupled to said output of said first special effect switch; two series circuits, respectively fed by said first and second general inputs, for extracting the modulated sub-carriers from said first and second input complex video signals and demodulating said sub-carriers, each of said series circuits having an output and comprising a filter and demodulating means; a second special effect switch having two signal inputs respectively coupled to said outputs of said two series circuits and an output; means for modulating a new sub-carrier, said modulating means having a modulation input coupled to said output of said second special effect switch and an output; filtering means, hereinafter referred to as "band restricting filtering means," said band restricting filtering means being inserted in $n$ of said channels, where $n$ is a positive integer smaller than three, and being adapted for eliminating from the output signal of said first special effect switch those components which are due to the sub-carriers included in said input complex video signals, the band-restricted signal resulting from the operation of said band restricting filtering means being hereinafter referred to as "special effect luminance signal"; means for generating crispening components of said special effect luminance signal and further means, controlled by switching means, referred to as "operating condition switching means," for selectively:

(a) switching said band restricting filtering means out of said $n$ channels and applying to said general output the output signal of said first special effect switch, or (b) leaving said band restricting filtering means inserted in said $n$ channels and adding said special effect luminance signal to said crispening components and to the output signal of said modulating means to build up the complex video signal which is applied to said general output.

8. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output," onto which the complex video signal to be transmitted is directed; a first special effect switch having two signal inputs respectively coupled to said first and second general inputs, and an output; two series circuits, respectively fed by said first and second general inputs, for extracting the modulated sub-carriers from said first and second input complex video signals and demodulating said sub-carriers, each of said series circuits having an output and comprising a filter, hereinafter referred to as a "sub-carrier filter," and demodulating means; a second special effect switch having two signal inputs, respectively coupled to said outputs of said two series circuits, and an output; means for modulating a new sub-carrier, said modulating means having a modulation input coupled to said output of said second special effect switch; a third filter having a pass-band complementary to that of said sub-carrier filters with respect to the frequency band of said input complex video signals, said third filter having an input coupled to said output of said first special effect switch and an output; and adder having a first input coupled to said output of said third filter, a second input coupled to said output of said modulating means, and an output; and a switch, which, in its first state, couples said general output to said output of said first special effect switch, and which, in its second state, connects said general output to said output of said adder.

9. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output," onto which the complex video signal to be transmitted is directed; a first special effect switch having two signal inputs respectively coupled to said first and second general inputs, and an output; two series circuits, respectively fed by said first and second general inputs, for extracting the modulated sub-carriers from said first and second input complex video signals and demodulating said sub-carriers, each of said series circuits having an output and comprising a filter, hereinafter referred to as a "sub-carrier filter," and demodulating means; a second special effect switch having two signal inputs, respectively coupled to said outputs of said two series circuits, and an output; means for modulating a new sub-carrier, said modulating means having a modulation input coupled to the output of said second special effect switch; a third filter having a pass-band complementary to that of said sub-carrier filters with respect to the frequency band of said input complex video signals, said third filter having an input coupled to said output of said first special effect switch and an output; a fourth filter having the same pass-band as said sub-carrier filters, said fourth filter having an input fed in parallel with said input of said third filter by said output of said first special effect switch; and an adder having a first input connected to said output of said third filter, a second input, and an output, which is said general output; and a two-state operating condition switch, which, in its first state, connects said second input of said adder to said output of said fourth filter, and, in its second state, couples said second input of said adder to said output of said modulating means.

10. A system as claimed in claim 9, wherein one of said third and fourth filters is built up by a subtractor having a first input coupled to said first special effect switch output and a second input coupled to the output of the other one of said third and fourth filters.

11. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signals respectively supplied by said first and second source, and an output, hereinafter referred to as the "general output," onto which the complex video signal to be transmitted is directed; a first special effect switch having two signal inputs respectively coupled to said first and second general inputs, and an output; two series circuits, respectively fed by said first and second general inputs, for extracting the modulated sub-carriers from said first and second input complex video signals and demodulating said sub-carriers, each of said series circuits having an output and comprising a filter, hereinafter referred to as a "sub-carrier filter," and demodulating means; a second special effect switch having two signal inputs, respectively coupled to said outputs of said two series circuits, and an output; means for modulating a new sub-carrier, said modulating means having a modulation input coupled to the output of said second special effect switch; a third filter having a pass-band complementary to that of said sub-carrier filters with respect to the frequency band of said input complex signals, said third filter having an input coupled to said output of said first special effect switch and an output; a fourth filter having the same pass-band as said sub-carrier filters, said fourth filter having an input fed in parallel with said input of said third filter by said output of said first special effect switch; a first adder having a first input connected to said output of said third filter, a second input, and an output which is said general output; crispening components generating means having an input coupled to said third filter output and an output; a second adder having two inputs respectively coupled to said outputs of said modulating means and of said crispening components generating means and an output; and a two-state operating condition switch which, in its first state, connects said second input of said first adder to said output of said fourth filter and, in its second state, connects said second input of said first adder to said output of said second adder.

12. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output,"

onto which the complex video signal to be transmitted is directed; a first special effect switch having two signal inputs respectively coupled to said first and second general inputs, and an output; two series circuits, respectively fed by said first and second general inputs, for extracting the modulated sub-carriers from said first and second input complex video signals and demodulating said sub-carriers, each of said series circuits having an output and comprising a filter, hereinafter referred to as a "sub-carrier filter," and demodulating means; a second special effect switch having two signal inputs, respectively coupled to said outputs of said two series circuits and an output; means for modulating a new sub-carrier, said modulating means having a modulation input coupled to the output of said second special effect switch; a third filter having a pass-band complementary to that of said sub-carrier filters with respect to the frequency band of said input complex video signals, said third filter having an input coupled to said output of said first special effect switch and an output; a subtractor having a first input coupled to said output of said first special effect switch, and a second input coupled to said output of said third filter; a first adder having a first input connected to said output of said third filter, a second input, and an output which is said general output; crispening components generating means having an input coupled to the output of said third filter, and an output; a second adder having two inputs respectively coupled to said outputs of said crispening components generating means and of said modulating means, and an output; and a two-state operating condition switch which, in its first state, couples said second input of said first adder to said output of said subtractor, and, in its second state, couples said second input of said first adder to said output of said second adder.

13. A system for generating special effects by means of signals supplied by a first and a second source, in a colour television system wherein the complex video signal comprises a luminance signal and a sub-carrier modulated by a colour signal, said modulated sub-carrier occupying a frequency band which is included, at least partially, in the spectrum of said luminance signal, said system comprising: a first and a second input, hereinafter referred to as the first and second "general inputs," for applying thereto a first and a second complex video signal respectively supplied by said first and second source, and an output, hereinafter referred to as the "general output," onto which the complex video signal to be transmitted is directed; a first special effect switch, having two signal inputs respectively coupled to said first and second general inputs, and an output; two series circuits, respectively fed by said first and second general inputs, for extracting the modulated sub-carriers from said first and second input complex video signals and demodulating said sub-carriers, each of said series circuits having an output and comprising a filter, hereinafter referred to as a "sub-carrier filter," and demodulating means; a second special effect switch having two signal inputs respectively coupled to said outputs of said two series circuits and an output; means for modulating a new sub-carrier, said modulating means having a modulation input coupled to the output of said second special effect switch; an adder and a subtractor having respective first and second inputs, and respective outputs; said output of said adder building up said general output; said first input of said adder and said second input of said subtractor being fed in parallel by said output of said first special effect switch, and said first input of said subtractor being coupled to said output of said modulating means; a further filter having the same pass-band as said sub-carrier filters, said further filter having an input, and an output connected to said second input of said adder; and a two-state operating condition switch, which, in its first state, connects said input of said further filter to ground, and in its second state, couples said input of said further filter to said output of said subtractor.

References Cited by the Examiner

UNITED STATES PATENTS

| | | | |
|---|---|---|---|
| 2,808,455 | 10/1957 | Moore | 178—5.4 |
| 2,964,589 | 12/1960 | Walker | 178—5.4 |

DAVID G. REDINBAUGH, *Primary Examiner.*

JOHN W. CALDWELL, *Examiner.*

J. A. O'BRIEN, *Assistant Examiner.*